(12) United States Patent
Takakura

(10) Patent No.: US 6,494,430 B2
(45) Date of Patent: Dec. 17, 2002

(54) MOTOR HOLDER INCLUDING RADIAL AND OBLIQUE CONNECTING MEMBERS

(75) Inventor: Kiyoshi Takakura, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/827,198

(22) Filed: Apr. 6, 2001

(65) Prior Publication Data

US 2002/0023997 A1 Feb. 28, 2002

(30) Foreign Application Priority Data

Apr. 25, 2000 (JP) ........................ 2000-124337

(51) Int. Cl.[7] ........................ F16M 13/00; F16M 1/00; F16M 3/00
(52) U.S. Cl. ........................ 248/603; 248/638; 248/903; 248/562
(58) Field of Search ................ 248/562, 618, 248/632, 634, 637, 638, 903, 346.01, 603; 417/360; 415/119, 121.2, 208.2

(56) References Cited

U.S. PATENT DOCUMENTS

| | | | | |
|---|---|---|---|---|
| 1,611,795 A | * | 12/1926 | Warner | 248/358 |
| 2,881,995 A | * | 4/1959 | Neher | 248/358 |
| 2,951,634 A | | 9/1960 | Koch | |
| 3,239,185 A | * | 3/1966 | Sweeney | 248/358 |
| 4,200,257 A | * | 4/1980 | Litch | 248/604 |
| 4,293,114 A | * | 10/1981 | Lykes | 248/604 |
| 5,460,485 A | | 10/1995 | Sugiyama et al. | |
| 5,466,120 A | | 11/1995 | Takeuchi et al. | |
| 5,533,704 A | * | 7/1996 | Fischinger | 248/603 |
| 5,878,990 A | * | 3/1999 | Delire | 248/604 |
| 6,036,444 A | * | 3/2000 | Barney | 416/247 |
| 6,139,265 A | * | 8/2000 | Alizadeh | 415/208.1 |
| 6,158,979 A | * | 12/2000 | Couetoux | 417/360 |
| 6,189,873 B1 | * | 2/2001 | Aoki | 267/140.14 |
| 6,360,703 B1 | * | 3/2002 | Rahbar | 123/41.49 |

FOREIGN PATENT DOCUMENTS

| | | |
|---|---|---|
| DE | 19504970 | 8/1996 |
| EP | 0900941 A2 | 3/1999 |
| JP | U-53-33971 | 8/1951 |
| JP | U-55-148365 | 10/1954 |
| JP | U-51-127315 | 11/1976 |
| JP | A-2-131724 | 5/1990 |
| JP | A-5-149292 | 6/1993 |
| JP | A-6-280799 | 10/1994 |

* cited by examiner

Primary Examiner—Ramon O. Ramirez
Assistant Examiner—Amy J. Sterling
(74) Attorney, Agent, or Firm—Law Offices of David G. Posz (57) ABSTRACT

A motor holder includes a motor housing segment, a plurality of radial ribs and a venturi ring segment. The motor housing segment receives and supports the motor. The radial ribs extend radially outwardly from an outer peripheral surface of the motor housing segment. The venturi ring segment is connected to radially outer ends of the radial ribs and circumferentially surrounds the motor housing segment. The motor holder further includes a plurality of oblique ribs. Each one of the oblique ribs is arranged between and is connected to each adjacent two radial ribs. Furthermore, each one of the oblique ribs is oblique to a radial direction that extends from the motor housing segment.

11 Claims, 6 Drawing Sheets

MOTOR HOLDER INCLUDING RADIAL AND OBLIQUE CONNECTING MEMBERS

CROSS REFERENCE TO RELATED APPLICATION

This application is based on and incorporates herein by reference Japanese Patent Application No. 2000-124337 filed on Apr. 25, 2000.

BACKGROUND OF THE INVENTION

1. Field of the Invention

The present invention relates to a motor holder for holding a motor.

2. Description of Related Art

A motor holder for holding a vehicular blower motor to be secured to a vehicle body has been generally manufactured from an iron plate material. However, recently, a resin material is predominantly used for manufacturing the motor holder for the purposes of weight reduction and standardization.

Figure 7:
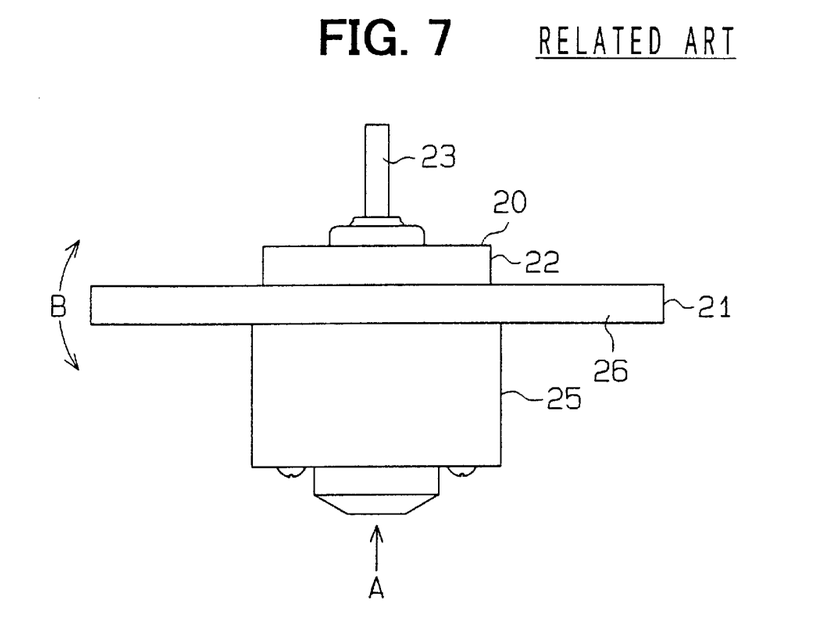
FIG. 7 is a schematic front view of the previously proposed motor holder depicted in FIG. 3A and a blower motor received in the motor holder.
Figure 8:
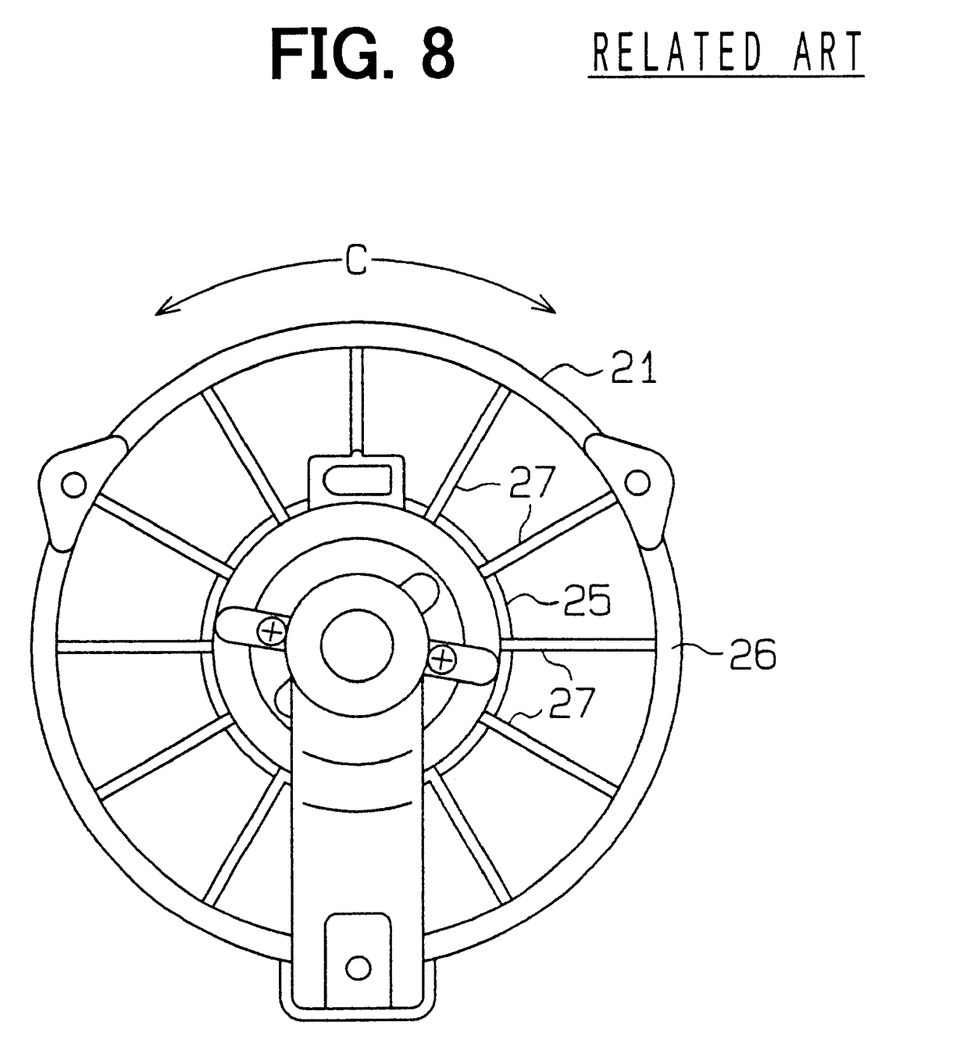
FIG. 8 is a bottom plan view of the previously proposed motor holder seen in a direction of an arrow A in FIG. 7.

One example of such a motor holder will be described with reference to FIGS. 7 and 8. FIG. 7 is a front view of a previously proposed motor holder 21 and a blower motor 20 received in the motor holder 21. FIG. 8 is a bottom plan view of the motor holder 21 (seen in a direction of an arrow A in FIG. 7).

With reference to FIG. 7, a motor case 22 of the blower motor 20 is a generally cylindrical hollow body. An armature (not shown) is rotatably supported within the motor case 22 via a rotatable shaft 23. Magnets (not shown) for generating a rotational force of the armature are secured to an inner peripheral surface of the motor case 22.

The motor holder 21 is made of a resin material. Furthermore, as shown in FIGS. 7 and 8, the motor holder 21 includes a motor housing segment 25 for receiving the blower motor 20, a venturi ring segment 26 and a plurality of connecting members 27 that connect the motor housing segment 25 to the venturi ring segment 26. With reference to FIG. 8, the venturi ring segment 26 is constructed to circumferentially surround an outer peripheral surface of the motor housing segment 25. The connecting members 27 extend radially outwardly from the outer peripheral surface of the motor housing segment 25. Radially outer ends of the connecting members 27 are connected to the venturi ring segment 26.

In the motor holder 21, a thickness of each segment is minimized (1–3 mm thick) to achieve both the weight reduction of the motor holder 21 and the improved moldability of the resin material. Since the thin resin material that has a lower rigidity than the iron plate material is used in manufacturing of the motor holder 21, the motor holder 21 is prone to generate vibrational noise during operation of the blower motor 20. However, as described above, the radial connecting members 27 are formed to extend in the radial direction in the motor holder 21. Thus, the rigidity of the motor holder 21 is improved, so that the vibrational noise generated during the operation of the blower motor 20 is reduced.

However, as shown in FIG. 8, in the motor holder 21 having the radial connecting members 27, although the rigidity in an axial direction (direction of an arrow B in FIG. 7) is fairly sufficient, the rigidity in a circumferential direction (direction of an arrow C in FIG. 8) is insufficient, so that relatively large vibrational noise can still be generated. Thus, there is still a need to further reduce the vibrational noise.

SUMMARY OF THE INVENTION

The present invention addresses the above disadvantages. Thus, it is an objective of the present invention to provide a motor holder having a reduced vibrational noise level during operation of a motor that is received in the motor holder.

To achieve the objective of the present invention, there is provided a motor holder for holding a motor. The motor holder includes a motor housing segment, a plurality of radial connecting members and a venturi ring segment. The motor housing segment receives and supports the motor. The radial connecting members extend radially outwardly from an outer peripheral surface of the motor housing segment. The venturi ring segment is connected to radially outer ends of the radial connecting members and circumferentially surrounds the motor housing segment. The motor holder further includes a plurality of oblique connecting members. Each one of the oblique connecting members is arranged between and is connected to each adjacent two radial connecting members. Furthermore, each one of the oblique connecting members is oblique to a radial direction that extends from the motor housing segment.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A motor holder for receiving a blower motor of a vehicular air conditioning system according to one embodiment of the present invention will be described with reference to the accompanying drawings.

Figure 1:
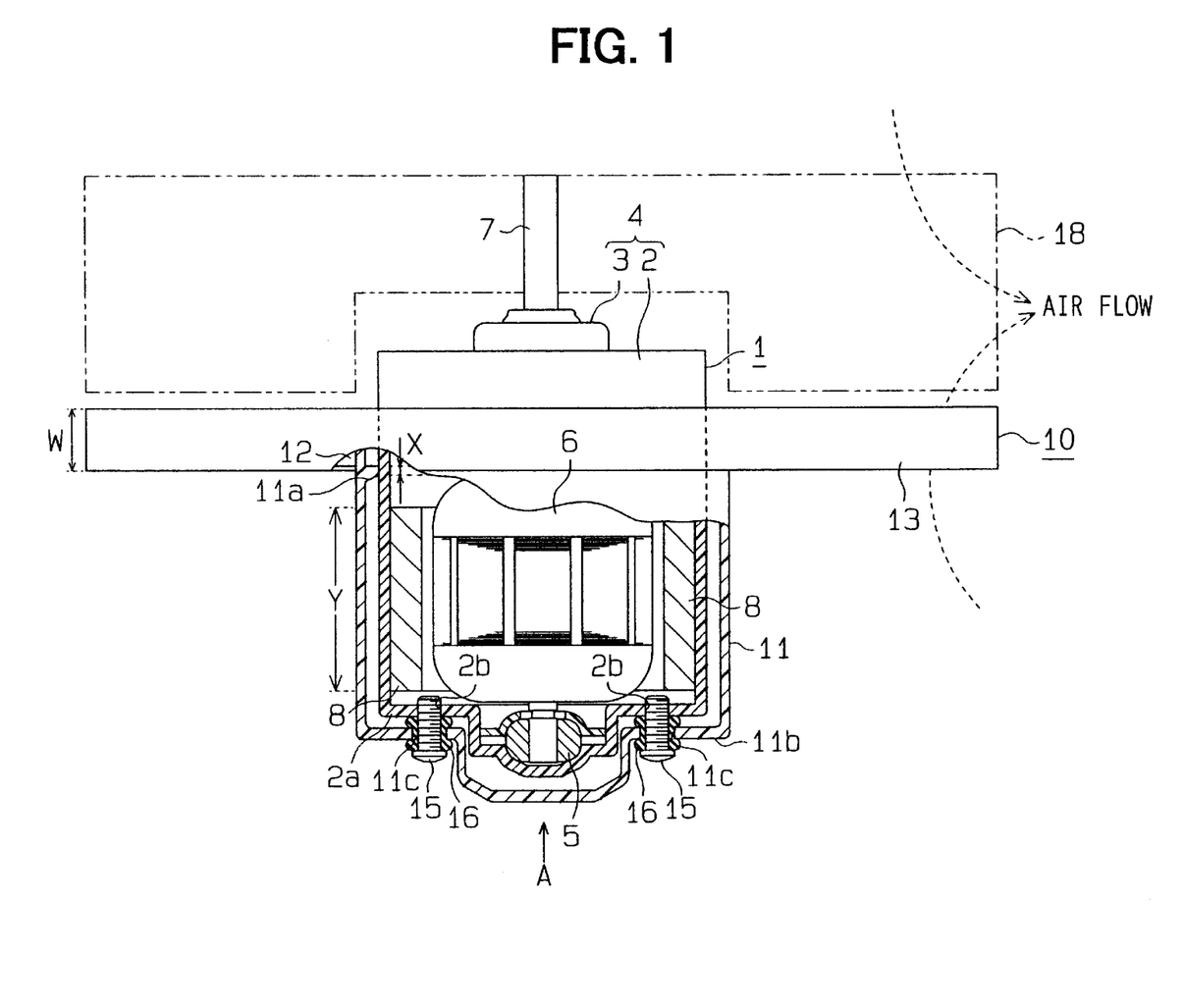
FIG. 1 is a partial cutaway cross-sectional view showing a construction of a motor holder and a construction of a blower motor received in the motor holder according to an embodiment of the present invention.

As shown in FIG. 1, the blower motor 1 received in the motor holder 10 includes a generally cup-shaped yoke housing 2 and a generally disk-shaped end frame 3. The end frame 3 is secured to the yoke housing 2 to close an open end of the yoke housing 2. In the present embodiment, the yoke housing 2 and the end frame 3 together constitute a motor case 4. A bearing 5 for rotatably supporting a rotatable shaft 7 of a rotor 6 is provided in both the yoke housing 2 and the end frame 3. Magnets 8 are secured to an inner peripheral surface of the yoke housing 2 such that the magnets 8 are diametrically opposed to one another about the rotor 6. At a base 2a of the yoke housing 2, a plurality of threaded holes 2b are arranged at locations that are radially outwardly displaced from a center of the base 2a. In the present embodiment, there are provided two threaded holes 2b that are spaced at 180 degree intervals.

The blower motor 1 is held such that the yoke housing 2 of motor case 4 is floatingly supported by the motor holder 10.

Figure 2:
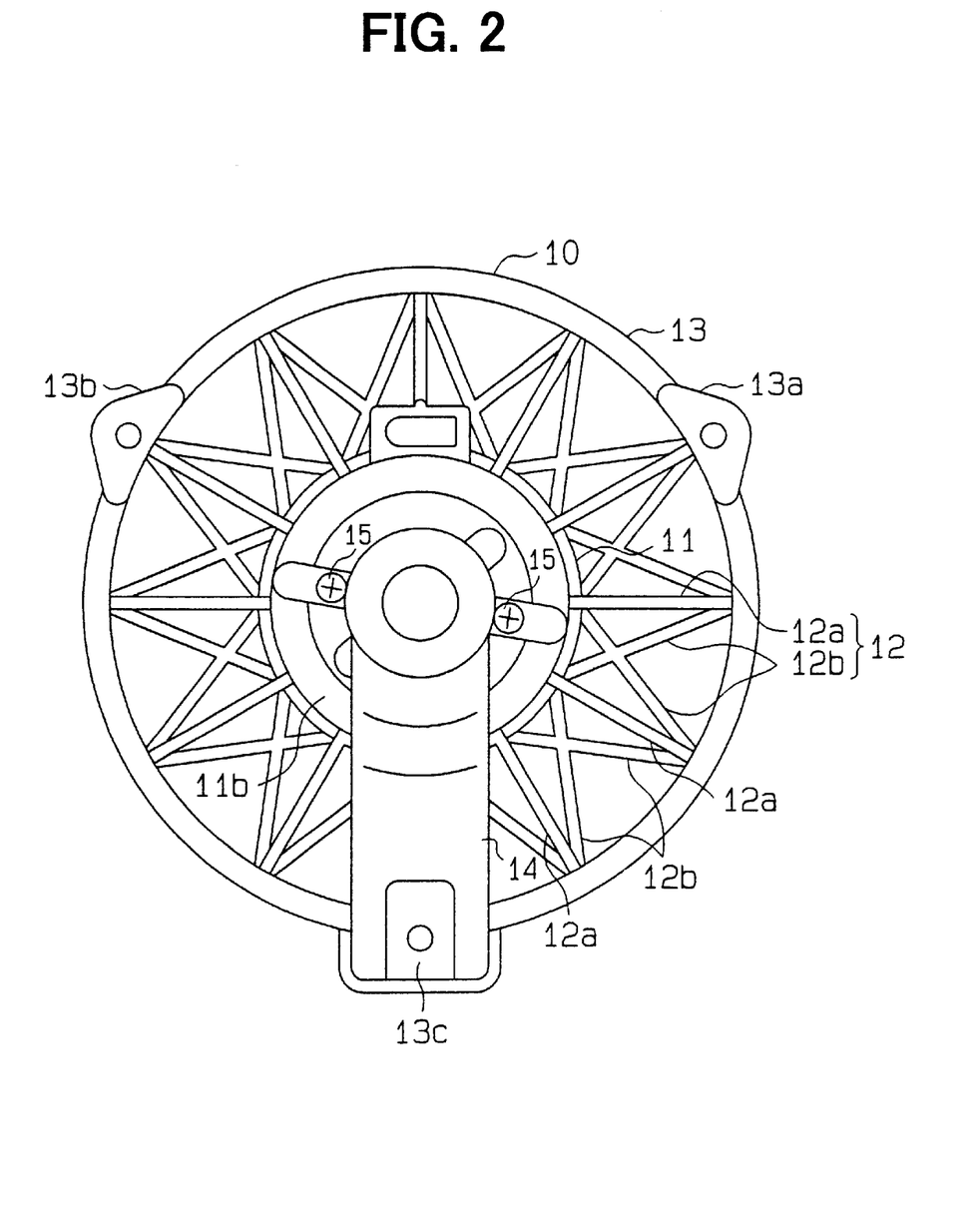
FIG. 2 is a bottom plan view of the motor holder seen in a direction of an arrow A in FIG. 1.

Specifically, the motor holder 10 is made of a resin material. Furthermore, as shown in FIGS. 1 and 2, the motor holder 10 includes a generally cup-shaped motor housing segment 11, a plurality of connecting segments (connecting members) 12 and a venturi ring segment 13. The motor housing segment 11 receives the motor case 4 of the blower motor 1. The connecting segments 12 extend radially outwardly from an outer peripheral surface of the motor housing segment 11. The venturi ring segment 13 is connected to distal ends of the connecting segments 12 and circumferentially surrounds the outer peripheral surface of the motor housing segment 11. As shown in FIG. 2, the venturi ring segment 13 includes securing portions 13a, 13b and 13c that are to be secured to a vehicle body (not shown) acting as a supporting structure. Between the securing portion 13c and the motor housing segment 11, there is provided a duct 14 through which cooling air for cooling the blower motor 1 flows.

As shown in FIG. 1, a plurality of projections la that abut and support an outer peripheral surface of the yoke housing 2 are formed on an inner peripheral surface of the motor housing segment 11 on the open end side of the motor housing 11. In the present embodiment, there are provided six protrusions 11a that are circumferentially spaced at equal angular intervals (60 degree intervals). A size of each component (such as the motor housing segment 11) is selected in such a manner that a second axial length x along the outer peripheral surface of the yoke housing 2 to which the projections 11a abut does not overlap or separated from a first axial length Y along the inner peripheral surface of the yoke housing 2 to which the magnets 8 are secured. Furthermore, in the motor holder 10, a thickness of each component is minimized (1–3 mm thick) to achieve the weight reduction or weight saving of the motor holder 10 and the improved moldability of the resin material.

At a base 11b of the motor housing segment 11, there are formed a plurality of through holes 11c that are aligned with the threaded holes 2b of the yoke housing 2. A screw 15 is received through each through hole 11c and is threaded into the corresponding threaded hole 2b of the yoke housing 2. With this arrangement, the base 2a of the yoke housing 2 is connected to the base 11b of the motor housing segment 11 in a non-rotatable and axially immovable manner. A rubber vibration isolator 16 is interposed between each through hole 11c and the corresponding screw 15. Thus, while the base 2a of the yoke housing 2 is secured, the outer peripheral surface of the yoke housing 2 is supported by the projections 11a that abut the outer peripheral surface of the yoke housing 2.

As shown in FIG. 2, the connecting segments 12 of the present embodiment include radial ribs 12a and oblique ribs 12b that together form a star shape configuration. In the present embodiment, the radial ribs 12a act as radial connecting members, and the oblique ribs 12b act as oblique connecting members.

Specifically, each radial rib 12a extends radially outwardly from the outer peripheral surface of the motor housing segment 11 and has a radially outer end connected to the venturi ring segment 13. Each oblique rib 12b is obliquely arranged between and is connected to each two adjacent radial ribs 12a. That is, each oblique rib 12b is arranged in such a manner that the oblique rib 12b connects a radially outer end of one of the adjacent two radial ribs 12a to a radially inner end of the other of the adjacent two radial ribs 12a. Furthermore, the oblique ribs 12b are arranged in pairs in the embodiment shown in FIG. 2, and each pair of oblique ribs 12b is arranged between each corresponding adjacent two radial ribs 12a. Each connecting segment 12 (12a, 12b) has an axial width that is substantially the same as an axial width W (FIG. 1) of the venturi ring segment 13 and extends in a direction parallel to an axial direction of the motor 1. The air flows between the connecting segments 12 (12a, 12b).

As shown in FIG. 1, a fan 18 indicated with a dot-dot-dash line is secured to the rotatable shaft 7 of the blower motor 1. When the blower motor 1 is driven to rotate the fan 18, the air located above the fan 18 and the air located below the motor holder 10 are taken in by the fan 18 and are expelled to the lateral side of the fan 18 to conduct a blowing operation, as indicated with dotted lines in FIG. 1. At this stage, the air located below the motor holder 10 is taken in by the fan 18 through the spaces defined between the radial ribs 12a and the oblique ribs 12b of the connecting segments 12.

During the operation of the motor, small vibrations are generated on the surface of the yoke housing 2 of the motor 1 by magnetic variations (more specifically, magnetic variations generated during rotation of the rotor 6 relative to the magnets 8 secured to the inner peripheral surface of the yoke housing 2). The small vibrations are damped by both the projections 11a and the rubber vibration isolators 16. Furthermore, as described above, the motor holder 10 of the present embodiment includes the radial ribs 12a and the oblique ribs 12b to improve the rigidity of the motor holder 10. Thus, the vibrations that are generated during the operation of the motor 1 and that are then transmitted to the vehicle body through the motor holder 10 are reduced because of the improved rigidity of the motor holder 10. As a result, a sound level of a vehicle cabin is reduced.

Figure 3A:
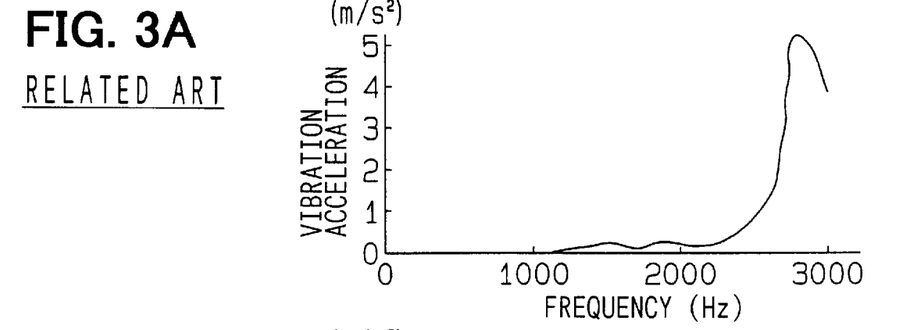
FIG. 3A is a graph showing results of vibration analysis of a previously proposed motor holder.
Figure 3B:
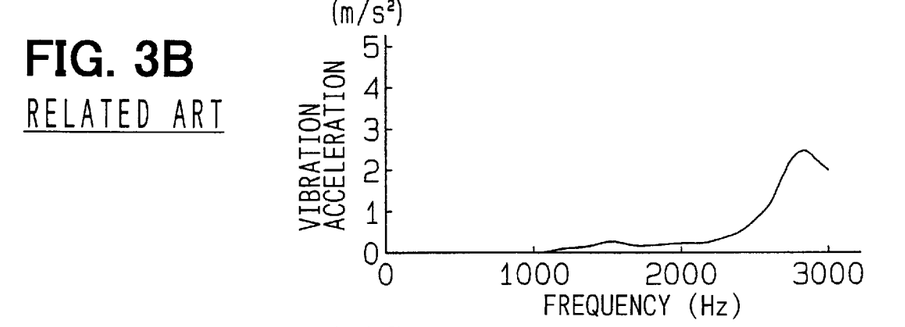
FIG. 3B is a graph showing results of vibration analysis of a different relevant motor holder.
Figure 3C:
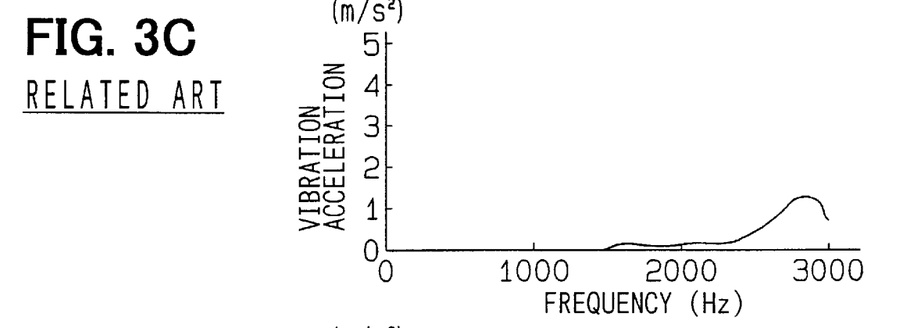
FIG. 3C is a graph showing results of vibration analysis of another different relevant motor holder.
Figure 3D:
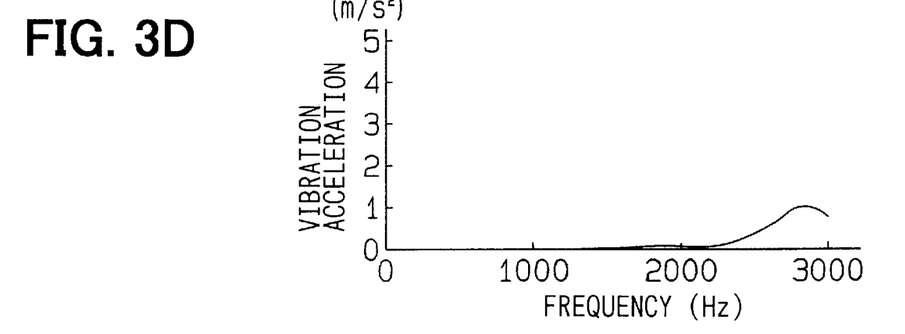
FIG. 3D is a graph showing results of vibration analysis of the motor holder according to the present embodiment shown in FIGS. 1 and 2.

Results of vibration analysis (results of CAE analysis) of the venturi ring segment 13 of the motor holder 10 according to the present embodiment are shown in FIG. 3D. For comparative purpose, results of vibration analysis of motor holders other than the motor holder 10 are shown in FIGS. 3A–3C. More specifically, FIG. 3A shows results of vibration analysis of the previously proposed motor holder 21 shown in FIG. 8. FIG. 3B shows results of vibration analysis of a motor holder 31 shown in FIG. 4. FIG. 3C shows results of vibration analysis of a motor holder 41 shown in FIG. 5. Throughout FIGS. 3A–3D, a horizontal axis shows a frequency, and a vertical axis shows a vibration acceleration.

Figure 4:
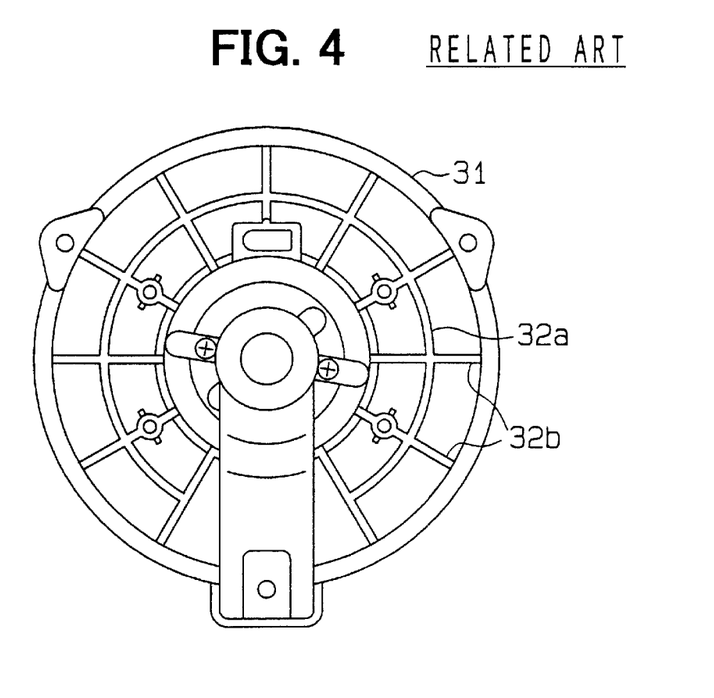
FIG. 4 is a bottom plan view of the relevant motor holder depicted in FIG. 3B.
Figure 5:
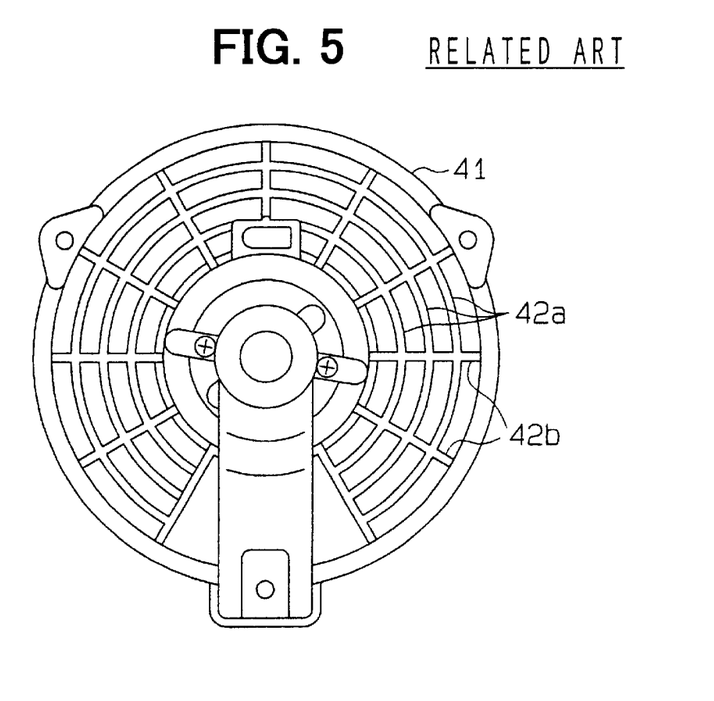
FIG. 5 is a bottom plan view of the relevant motor holder depicted in FIG. 3C.

The motor holder 31 shown in FIG. 4 is substantially the same as the previously proposed motor holder 21 shown in FIG. 8 except that the motor holder 31 has a circumferential rib 32a. That is, like the previously proposed motor holder 21, the motor holder 31 includes radial ribs (radial connecting members) 32b. The circumferential rib 32a extends circumferentially to connect radially middle points of the radial ribs 32b. The motor holder 41 shown in FIG. 5 is substantially the same as the motor holder 31 shown in FIG. 4 except that the number of circumferential ribs 42a that connect the radial ribs (radial connecting members) 42b is increased.

As shown in FIGS. 3A–3D, the vibration acceleration of each holder 21, 31, 41 or 10 shows a peak around 2700 Hz. However, the vibration accelerations of these holders 21, 31, 41 and 10 decrease in the following order: the motor holder 21 (FIG. 3A)>the motor holder 31 (FIG. 3B)>the motor holder 41 (FIG. 3C)>the motor holder 10 (FIG. 3D). The motor holder 10 according to the present embodiment shows the smallest vibrations among them.

That is, the previously proposed motor holder 21 depicted in FIGS. 7 and 8 shows the relatively high rigidity in the axial direction of the motor (the direction of the arrow B in FIG. 7) due to the radial ribs (radial connecting members) 27 but shows the relatively poor rigidity in the circumferential direction (the direction of the arrow C in FIG. 8), so that the vibrations cannot be sufficiently restricted. On the other hand, with reference to FIGS. 4 and 5, the motor holders 31 and 41 have the relatively higher rigidity in the circumferential direction due to the circumferential rib(s) 32a and 42a, so that the vibrations in the motor holders 31 and 41 can be restricted more effectively. However, in this case, in order to attain the rigidity similar to that of the motor holder 10 only by adding the circumferential ribs 32a or 42a, the number of the circumferential ribs 32a or 42a of the motor holder 31 or 41 should be disadvantageously increased, thereby resulting in an increase in the weight of the motor holder 31 or 41.

In contrast to this, by adding the oblique ribs 12b to the radial ribs 12a and arranging these ribs 12b and 12a in the star shape configuration shown in FIG. 2, the motor holder 10 according to the present embodiment shows relatively high rigidities in both the axial and circumferential directions with the minimum number of the ribs 12a and 12b.

Figure 6:
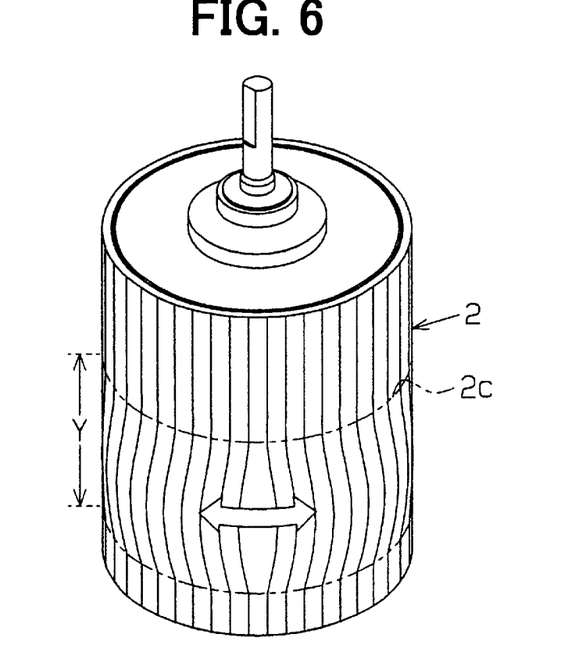
FIG. 6 is a schematic view schematically showing vibrations in a yoke housing of the blower motor shown in FIG. 1 during operation of the blower motor.

With reference to FIG. 6, in the yoke housing 2, the magnet holding region (indicated with dot-dot-dash lines in the drawing) 2c to which the magnets 8 are secured vibrates with a relatively large amplitude during the motor operation. In FIG. 6, deformation of this member is schematically shown to indicate the relatively large vibrational amplitude of the magnet securing region 2c.

In FIG. 6, a space between the dot-dot-dash lines corresponds to the first axial length Y along the inner peripheral surface of the yoke housing 2 to which the magnets 8 are secured. The projections 11a are arranged in such a manner that these projections 11a do not contact this magnet holding region of the yoke housing 2. That is, if the projections 11a engage the magnet holding region that vibrates with the large amplitude, the vibrations of this region are transmitted to the vehicle body through the motor holder 10, so that the sound level in the vehicle cabin is disadvantageously increased. However, the present embodiment, the projections 11a do not contact such a region that vibrates with the large amplitude, so that vibrations of the motor 1 that are transmitted to the motor holder 10 are reduced, thereby advantageously reducing the vibrational noise generated during the motor operation.

As described above, the present embodiment provides the following characteristics.

(1) The connecting members 12 that connect the motor housing segment 11 to the venturi ring segment 13 include the radial ribs 12a extending in the radial direction and the oblique ribs 12b extending obliquely between the radial ribs 12a. As a result, the rigidity of the motor holder 10 in the circumferential direction is increased in comparison to the previously proposed motor holder 21 that only includes the radial ribs. Thus, the anti-vibrational performance of the motor holder 10 is improved, thereby reducing the vibrational noise (vibrational noise level) generated during the motor operation. Furthermore, in comparison to the motor holders 31 and 41 that achieve the high rigidity in the circumferential direction with the circumferential ribs 32a and 42a, the motor holder 10 achieves the high rigidities both in the rotational and axial directions with the minimum number of ribs 12a and 12b. That is, with the present embodiment, it is possible to minimize an increase in the weight of motor holder while, the rigidity of the motor holder is increased. In other words, the oblique connecting members (oblique ribs 12b) that are obliquely arranged between the corresponding adjacent radial connecting (radial ribs 12a) allow the accomplishment of the seemingly contradictory goals, i.e., the weight saving of the motor holder and the increased rigidities of the motor holder (and accordingly the reduced motor vibrational noise level).

(2) The projections 11a do not directly contact the magnet holding region 2c that vibrates with the large amplitude during the motor operation. Thus, vibrations of the blower motor 1 that are transmitted to the motor holder 10 are reduced, thereby advantageously reducing the vibrational noise during the motor operation.

The above embodiment can be modified as follows.

In the above embodiment, when the blower motor 1 is driven to rotate the fan 18, the air located above the fan 18 and the air located below the motor holder 10 are taken in by the fan 18 and are expelled to the lateral side of the fan 18 to conduct the blowing operation, as indicated with dotted lines in FIG. 1. This arrangement can be modified such that the fan 18 takes in only the air located below the motor holder 10 and expels it to the lateral side of the fan 18 to conduct the blowing operation. Furthermore, instead of expelling the air to the lateral side of the fan 18, the air can be expelled to a bottom side of the motor holder 10.

Additional advantages and modifications will readily occur to those skilled in the art. The invention in its broader terms is therefore, not limited to the specific details, representative apparatus, and illustrative examples shown and described.

What is claimed is:

1. A motor holder for holding a motor, said motor holder comprising:

a motor housing segment for receiving and supporting said motor;

a plurality of radial connecting members that extend radially from an outer peripheral surface of said motor housing segment;

a venturi ring segment that is joined to radially outer ends of said plurality of radial connecting members and circumferentially surrounds said motor housing segment; and a plurality of oblique connecting members, each of which is oblique to a radial line that extends from said motor housing segment, wherein a radially outer end of at least one of said radial connecting members is joined to radially outer ends of two of said oblique connecting members such that said two oblique connecting members are symmetrically arranged about said radial connecting member that is joined to said two oblique connecting members, and radially inner ends of said two oblique connecting members are joined to said outer peripheral surface of said motor housing.

2. A motor holder according to claim 1, wherein two of said oblique connecting members are arranged in a pair, said pair of said oblique connecting members being positioned between two adjacent ones of said radial connecting members in such a manner that said two oblique connecting members of said pair intersect in a criss-cross fashion and are joined to said outer peripheral surface of said motor housing segment.

3. A motor holder according to claim 1, wherein said motor including a motor case that has a plurality of magnets secured to an inner peripheral surface of said motor case along a first axial length of said motor case, wherein said motor holder further includes a plurality of projections formed in an inner peripheral surface of said motor housing segment, each one of said plurality of projections abutting and supporting an outer peripheral surface of said motor case along a second axial length of said motor case, said first axial length of said motor case being separated from said second axial length of said motor case.

4. A motor holder according to claim 2, wherein each of two radially opposed angles defined by said two oblique connecting members of the pair is smaller than each of two circumferentially opposed angles defined by said two oblique connecting members of the pair.

5. A motor holder for holding a motor, said motor holder comprising:
- a motor housing segment for receiving and supporting said motor;
- a plurality of radial connecting members that extend radially from an outer peripheral surface of said motor housing segment;
- a venturi ring segment that is joined to radially outer ends of said plurality of radial connecting members and circumferentially surrounds said motor housing segment; and
- a plurality of oblique connecting members, each of which is oblique to a radial line that extends from said motor housing segment, wherein at least one of said oblique connecting members is arranged between two adjacent ones of said radial connecting members such that a radially inner end of said at least one oblique connecting member is joined to a radially inner end of one of said two adjacent radial connecting members and is also joined to said outer peripheral surface of said motor housing, and a radially outer end of said at least one oblique connecting member is joined to a radially outer end of the other one of said two adjacent radial connecting members and is also joined to said venturi ring.

6. A motor holder according to claim 5, wherein said radially outer end of said other one of said two adjacent radial connecting members and said venturi ring are also joined to a radially outer end of another one of said oblique connecting members.

7. A motor holder according to claim 6, wherein said at least one oblique connecting member and said another oblique connecting member are symmetrically arranged about said other one of said two adjacent radial connecting members.

8. A motor holder according to claim 5, wherein a radially inner end of said other one of said two adjacent radial connecting members and said outer peripheral surface of said motor housing segment are joined to a radially inner end of one of said oblique connecting members.

9. A motor holder according to claim 5, wherein at least three of said plurality radial connecting members are arranged at substantially equal angular intervals.

10. A motor holder according to claim 5, wherein each oblique connecting member entirely extends along a straight line.

11. A motor holder according to claim 5, wherein the venturi ring segment generally extends along a circle.

* * * * *